(12) United States Patent
Romney et al.

(10) Patent No.: US 10,098,318 B2
(45) Date of Patent: \*Oct. 16, 2018

(54) APPARATUS, SYSTEM, AND METHOD FOR SECURE AND COMFORTABLE ANIMAL ENCLOSURE

(71) Applicants: Victoria W. Romney, Midway, UT (US); Gordon W. Romney, Midway, UT (US); Todd H. Romney, Sandy, UT (US)

(72) Inventors: Victoria W. Romney, Midway, UT (US); Gordon W. Romney, Midway, UT (US); Todd H. Romney, Sandy, UT (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/799,686

(22) Filed: Oct. 31, 2017

(65) Prior Publication Data

US 2018/0064060 A1    Mar. 8, 2018

Related U.S. Application Data

(63) Continuation-in-part of application No. 15/068,351, filed on Mar. 11, 2016.

(60) Provisional application No. 62/131,756, filed on Mar. 11, 2015.

(51) Int. Cl.
| | | |
|---|---|---|
| *A01K 1/03* | (2006.01) | |
| *A01K 1/015* | (2006.01) | |
| *A01K 1/00* | (2006.01) | |
| *A01K 29/00* | (2006.01) | |
| *G09F 23/00* | (2006.01) | |
| *G06Q 30/06* | (2012.01) | |
| *A01K 5/02* | (2006.01) | |
| *A01K 1/035* | (2006.01) | |
| *G07F 17/12* | (2006.01) | |
| *G07C 9/00* | (2006.01) | |

(Continued)

(52) U.S. Cl.
CPC .............. *A01K 1/03* (2013.01); *A01K 1/0047* (2013.01); *A01K 1/015* (2013.01); *A01K 1/035* (2013.01); *A01K 5/02* (2013.01); *A01K 29/005* (2013.01); *G06Q 30/0645* (2013.01); *G07C 9/00071* (2013.01); *G07F 17/12* (2013.01); *G09F 23/00* (2013.01); *G06Q 20/4014* (2013.01); *G06Q 30/04* (2013.01)

(58) Field of Classification Search
CPC ...... A01K 1/033; A01K 1/0356; A01K 1/035; A01K 1/034; A01K 29/005; G07F 17/10; G07F 17/12; G07F 7/08
USPC ....... 119/795, 476, 479, 416, 421, 432, 448, 119/457, 482, 493, 496, 500, 452, 456, 119/475, 484, 498
See application file for complete search history.

(56) References Cited

U.S. PATENT DOCUMENTS 3,962,994 A    6/1976 Petrucciani
5,722,351 A \*  3/1998 Roper .................... G07F 17/10
                                                   119/795

(Continued)

*Primary Examiner* — Yvonne R Abbott-Lewis
(74) *Attorney, Agent, or Firm* — Kunzler, PC (57) ABSTRACT

An apparatus, system, and method are disclosed for a secure and comfortable animal enclosure providing convenient automated access and payment with validated User identification and validated animal identification linked to the animal's vaccinations and health records and configured for use in or near business, commercial, entertainment, workplace and other venues.

26 Claims, 8 Drawing Sheets

(51) Int. Cl.
    *G06Q 20/40*         (2012.01)
    *G06Q 30/04*         (2012.01)

(56) References Cited

U.S. PATENT DOCUMENTS

| | | | |
|---|---|---|---|
| 8,253,533 B2 * | 8/2012 | Jones | G07C 9/00103 |
| | | | 340/5.61 |
| 8,544,418 B2 | 10/2013 | Jiang et al. | |
| 2005/0132974 A1 | 6/2005 | Little | |
| 2008/0282991 A1 * | 11/2008 | Krasoff | A01K 1/034 |
| | | | 119/456 |
| 2012/0291715 A1 | 11/2012 | Jiang et al. | |
| 2013/0068172 A1 * | 3/2013 | Hoegh | A01K 1/0017 |
| | | | 119/481 |
| 2014/0035721 A1 * | 2/2014 | Heppe | G07C 9/00912 |
| | | | 340/5.54 |
| 2015/0007619 A1 * | 1/2015 | Finney | G07F 17/10 |
| | | | 70/58 |
| 2016/0262343 A1 * | 9/2016 | Romney | G07F 17/12 |
| 2017/0027131 A1 * | 2/2017 | Brownridge | A01K 1/034 |
| 2017/0036032 A1 | 2/2017 | Schuler et al. | |
| 2017/0300069 A1 * | 10/2017 | Irwin | B65G 1/0485 |
| 2017/0330194 A1 | 11/2017 | Gibbs | |

* cited by examiner

APPARATUS, SYSTEM, AND METHOD FOR SECURE AND COMFORTABLE ANIMAL ENCLOSURE

CROSS-REFERENCES TO RELATED APPLICATIONS

This application claims the benefit of U.S. Provisional Patent Application No. 62/131,756 entitled SECURE AND COMFORTABLE ANIMAL ENCLOSURE filed on Mar. 11, 2015 for Victoria W. Romney, and of U.S. patent application Ser. No. 15/068,351 entitled APPARATUS, SYSTEM, AND METHOD FOR SECURE AND COMFORTABLE ANIMAL ENCLOSURE filed on Mar. 11, 2016, both of which are incorporated herein by reference.

FIELD OF THE INVENTION

This invention relates to an animal enclosure and more particularly relates to a safe and convenient temporary enclosure for pets.

BACKGROUND

Description of the Related Art

Pet ownership is a substantial feature of life in America and other countries throughout the world. According to the American Veterinary Medicine Association [AVMA] 36.5% of American households own dogs, for a total of 69,926,000 dogs in 43,346,000 households. Yet people, including pet owners, are increasingly mobile, and may spend less time at home than ever. Adults work, often long hours, eat out, attend meetings, conventions, concerts, movies, amusement parks, and other entertainments, and travel for work and pleasure. Nevertheless, most stores, restaurants, theaters, bars, concert halls, conventions, amusement parks, and other venues admit only trained and registered service animals. And according to Angie's List dog owners can expect to pay from $240 to $550 per month for day care and boarding can range from $15.00 to more than $90.00 per night. Even then, not all of the services are satisfactory or safe for the pet and daycare or boarding facilities are typically not located sufficiently close to activity venues to be practical for brief errands.

Therefore, pet owners who need or desire to bring their animals on errands and outings too often leave the animal alone in the parked car. According to the AVMA hundreds of animals die of heat exhaustion in parked cars every year. On a 70-degree sunny day, the temperature inside a car can reach 104 degrees within half an hour. After an hour, it can climb to 113 degrees. Temperatures can increase 40 degrees within an hour, and partially opening the windows makes little difference. According to the Centers for Disease Control and Prevention when a car is parked in direct sunlight with outside temperatures of from 80 to 100 degrees the interior temperature can quickly reach between 130 and 172 degrees.

Michael Dix DVM, Medical Director, Best Friends Animal Society cautions pet owners, "Never leave your pet in a parked car when the outside temperature is above 70 degrees. Not even with the windows partway down, not even in the shade, not even for a quick errand. Dogs and cats can't sweat like humans, so they pant to lower their body temperature. If they're inside a car, recycling very hot air, panting gives no relief, and heat stroke can happen quickly". Jules Benson, DVM, Medical Director, Pet Plan Pet Insurance adds that "Heat stroke can permanently damage a pet's health very rapidly. The change of only a few degrees to a dog's normal body temperature can quickly result in coma, organ dysfunction, permanent brain damage or even death". Such a death involves suffering almost too harrowing to describe for a captive, helpless animal with no recourse for help and no avenue of escape.

Moreover, as of 2015 19 states (AZ, CA, DE, IL, ME, MD, MN, NV, NH, NJ, NY, NC, ND, RI, SD, TN, VT, WA, and WV) have statutes specifically prohibiting leaving an animal confined in a vehicle. Various local ordinances exist as well. So in addition to endangering an animal's life or health, a pet owner may run afoul of the law by simply jumping out to run a quick errand while leaving the animal in the car. Yet many pet owners do not have the option of a fenced yard and doggie door combination. Professional dog walkers may be expensive or unreliable and many pet owners do not have family or friends willing and able to take on the task. So a working pet owner, or one taking a vacation or going to errands or outings during the day, often has no practical alternative to leaving the pet alone at home or in a hotel. Indoors the pet cannot relieve itself for hours, and additionally may be crated for safety and control where it can neither exercise nor relieve itself. Veterinarians advise against confining a dog without a chance to relieve itself for more than about four to six hours during the day. Small pets can sometimes be taught to use a potty pad in the house but this is impractical for larger pets. Furthermore, dogs are social animals that need human interaction and are ill adapted to spending long periods alone.

From the foregoing discussion, it should be apparent that a need exists for an apparatus, system, and method for an animal enclosure that can offer safe, humane, comfortable, convenient, and cost effective short-term animal care. Beneficially, such an apparatus, system, and method would allow pet owners the freedom to include pets in appropriate activities and leave them safely during other activities. With such an apparatus, system, and method pet owners could house pets close to the workplace or other venues and interact with the animal during lunch and other breaks during the day. Additionally, pet owners could travel with their pets using a combination of pet friendly lodging and acceptable short-term housing during meetings and activities.

SUMMARY

The present invention has been developed in response to the present state of the art, and in particular, in response to the need for an animal enclosure that can offer safe, humane, comfortable, convenient, and cost effective short-term animal care.

Accordingly, the present invention has been developed to provide an apparatus, system, and method for a secure and comfortable animal enclosure that overcome many or all of the above-discussed shortcomings in the art.

An apparatus is presented herein for a secure and comfortable animal enclosure that comprises, in some embodiments, an end, a top, a side, a floor, and a point of access. In certain embodiments the enclosure also comprises a secure identification module that reads and processes a form of personal identification such as a credit card, a debit card, a bar code, a QT code, a driver's license, a smart card, a membership card, a PayPal identifier, a smartphone pay, a fob, a biometric and the like. Additionally the enclosure may comprise an animal identification module that reads and processes a form of animal identification such as a microchip, a brand, a biometric and the like and a payment module that reads and processes a payment method such as a credit card, a debit card, a bar code, a QT code, a driver's license, a smart card, a membership card, a PayPal identifier, a smartphone pay and the like. The enclosure sometimes also comprises a locking module that locks and/or releases in response to a signal originating in at least one of the secure identification module, the animal identification module and the payment module.

In certain embodiments the enclosure herein further comprises a soundproofing material such as noise cancelling technology, rigid foam, flexible foam, baffles, dead air space, or other sound suppressing material as known in the art. Sometimes the enclosure comprises a sensing module that senses at least one of temperature, odor, and moisture and/or an alert module that alerts an attendant that the enclosure needs attention.

In various embodiments the enclosure comprises a plurality of supports for a plurality of removable horizontal trays spaced at vertical intervals that are configured so that a first tray may be removed and a second tray inserted while an animal remains in the enclosure. The enclosure may comprise a climate control module that maintains the interior at a safe and comfortable temperature. The enclosure sometimes comprise an audio/visual module comprising an audio/visual receiving or broadcast module and/or an audio/visual capture and/or transmission module wherein the audio/visual module captures and transmits images from inside of the enclosure to a personal electronic device. In certain embodiments the enclosure herein comprises a decoration that includes a color, a design, and/or a holder configured to receive and retain a plaque, card, photograph, and/or other display. A brand, a store, a business, or other enterprise may optionally sponsor or provide the decoration. In certain embodiments the enclosure comprises a sensing module that senses and transmits at least one of temperature, humidity, odor, ventilation, and other information. The enclosure presented herein may further comprise a treat module comprising a signal receiver configured to receive a command including from a remote personal device, a dispensing module configured to dispense a treat to within the enclosure, and a charging module configured to track and invoice treat transactions.

Further provided herein is a structured array of a plurality of enclosures further comprising an interior open space wherein each enclosure comprises an outside-facing point of access that opens upon presentation of appropriate ID to receive or release an animal and an inside facing point of access that opens toward the interior open space. The aggregation sometimes comprises a roof, an attendant station, an attendant window, and/or a retain/display space.

The structured array of enclosures sometimes comprises a climate control module, an audio/visual receiving module, a media broadcast module, and/or an audiovisual transmission module. The structured array may be installed within or near a venue such as a shopping mall, an office complex, a municipal parking area, a restaurant a theater, a hospital, a medical office, a university, a meeting location, a convention, a carnival, or a dog show. In some embodiments the aggregation is incorporated into a municipal parking system.

A system for a secure and comfortable animal enclosure is also presented herein. In certain embodiments the system comprises a housing module comprising an animal enclosure or a plurality of animal enclosures in any configuration. The system also may comprise an access module that provides access to the housing module and that comprises a secure ID module, an animal ID module, a payment module, and a locking module. In various embodiments the system also comprises a communication module that provides inter-module communication and external bi-directional communication with communication networks and service providers and a database that stores identification information, registration information, animal health records, vendor and venue information, audio/visual information and other information relating to the system.

As presented herein the system sometimes comprises a registration module that presents registration options and accepts identification, payment, preference, and other information relating to User or animal registration with the system and also a verification module that verifies secure identification information, animal information, service provider information, and the like.

In some embodiments the system further comprises a treat module comprising a signal receiver configured to receive a command including from a remote personal device, a dispensing module configured to dispense a treat to within the enclosure, and a charging module configured to track and invoice treat transactions.

In various embodiments the system comprises a service module that accepts, transmits, and coordinates a User request for animal related services such as grooming, walking, training, and veterinary services and authorizes the access of an approved service provider to the relevant enclosure. The system may also comprise a billing module the calculates charges for use of the system based on cost schedules and at least one of special offers, merchant and other validations, and membership status and that bills the user, and a tracking module that tracks animal health records and other relevant information.

In some embodiments the communications module comprises a computer state machine that serves as the traffic manager over a set of modules to route process execution from the state of one module to other modules and wherein the state machine comprises at least one of a VLSI circuit, a gate array, a logic chip, a transistor, a programmable hardware device such as a field programmable gate array, programmable array logic, and a programmable logic device or the like and utilizes computer, telecommunications, cloud and digital security technologies. Any or all modules may have wireless and hardwire connectivity to the internet with an individual unique Internet Protocol address.

The system herein may further comprise an audio/visual module that transmits audio or visual content to the housing module, collects and transmits images from within the housing module to at least one of a smartphone, a tablet, a computer, or other personal receiving device, and/or posts content on at least one of a website and social media. In some embodiments the system herein also comprises a sensing and alert module that senses conditions within the housing module and alerts an attendant to a need for attention.

Also presented herein is a method for a secure and comfortable animal enclosure. In some embodiments the method comprises the steps of: provide a secure and comfortable animal enclosure comprising a secure ID module, an animal ID module, a locking module, and a payment module, provide a system for a secure and comfortable animal enclosure comprising a communication module, a database, a registration module, a verification module and a payment module, register a User with the system for a secure and comfortable animal enclosure, sense the User's identifying information, verify the User's identifying information, sense an animal's identifying information, verify the animal's identification information, retrieve the animal's health and/ or vaccination information, link the animal's health and/or vaccination information to at least one of the animal's identification information and the User's identification information, release the locking module; admit the animal and reengage the locking module; verify the User's identification information, release the locking module to remove the animal, and bill the User.

In certain embodiments the method further comprises the steps of: provide an audio/visual module and broadcast audiovisual content within the enclosure and/or transmit audiovisual content from within the enclosure to at least one of a personal electronic device and social media. The method sometimes also comprises provide a service module, identify a service request, verify a service provider's identification and give the service provider access to the enclosure. Sometimes the method herein further comprises provide and sensing module, sense conditions within the enclosure and alert an attendant and/or a User. In some embodiments the method further comprises providing an animal with a tracking device configured to emit a location signal to a receiver.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
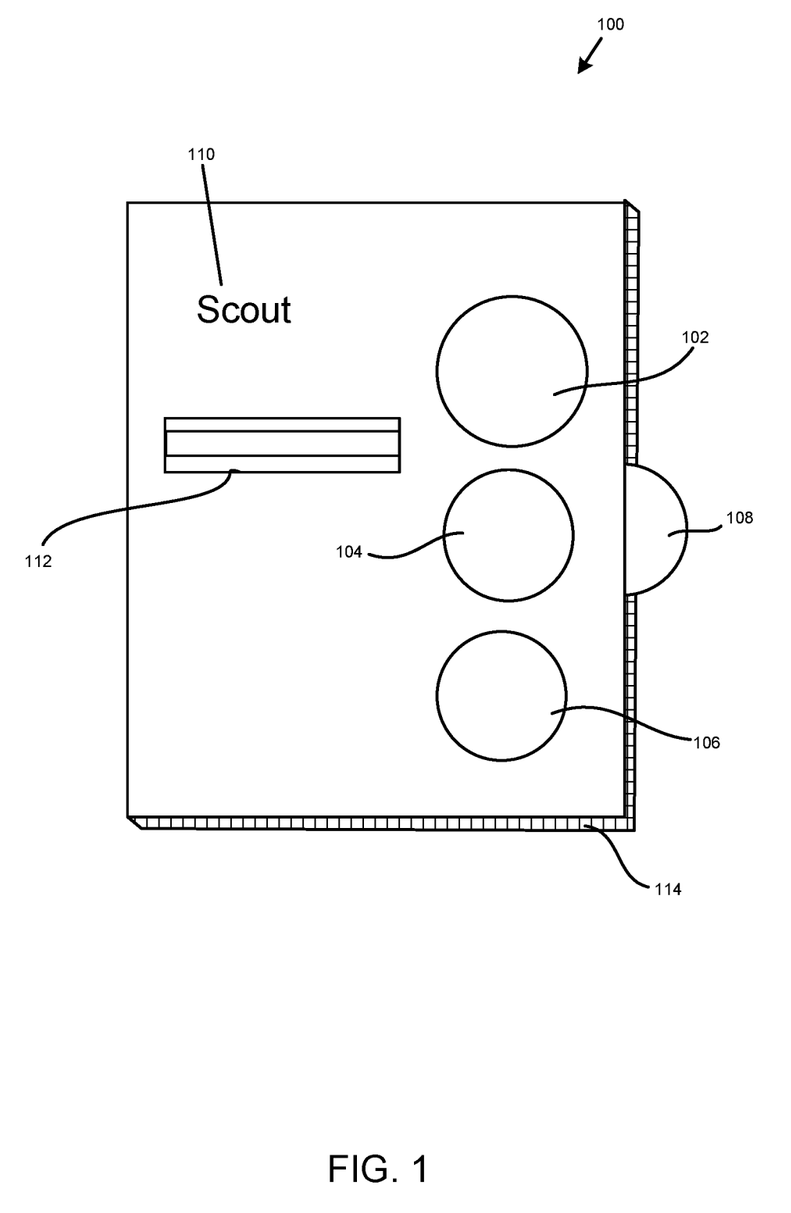
FIG. 1 is a schematic line drawing illustrating an embodiment of an access module in accordance with the present invention.

FIG. 1 depicts an embodiment of an access module 100 in accordance with the present invention. In the depicted embodiment the access module 100 comprises a door 101, an animal identification ("ID") module 102, a secure ID module 104, a payment module 106, and a locking module 108. In certain embodiments the door 101 comprises a decoration 110, a plaque holder 112, and a sound-proofing material 114. All of the elements of the access module 100 may be located on the door 101 and in certain embodiments elements may be located elsewhere, including remotely. In some embodiments the animal ID module 102 may be configured to recognize an animal's microchip and/or another form of non-transferrable animal identification including without limitation a biometric or brand. The secure ID module 104 may be configured to recognize, without limitation, a credit card, a debit card, a bar code, a QT code, a driver's license, a smart card, a membership card, a PayPal identifier, a smartphone pay, a fob, a biometric, or other information source. In certain embodiments the payment module is configured to accept one or more of a credit card, a debit card, a membership card, a validation, a PayPal code, a smartphone pay, cash, or other payment method. The locking module 108 sometimes comprises one or more of a code pad, a lock and keyhole assembly, a magnetic closure, a bolt and shaft, a solenoid, a mortise, a lever tumbler, or other module as known in the art. The animal ID module 102, the secure ID module 104, the payment module 106, and the locking module 108 may be separate, combined in any configuration of modules, or combined in one module.

In various embodiments a first release of the locking module 108 is triggered by one or both of recognition of an animal ID by the animal ID module 102 or of a secure ID by the secure ID module 104. In some embodiments the locking module releases upon receipt of a signal and/or engagement with a form of identification, a physical key, a fob, a code, or other trigger. In various embodiments the locking module 108 releases in response to a signal from the secure ID module 104, the animal ID module 102, or the payment module 106. In some embodiments the first release of the locking module 108 and consequent opening of the door 101 allows insertion of an animal. The locking module 108 sometimes locks automatically upon closure of the door 101. In various embodiments the locking module 108 may lock upon recognition of a physical key, a fob, a code, credit card, a signal from the secure ID module 104, the animal ID module 102, and/or the payment module 106.

In some embodiments recognition of a credit card, a debit card, a bar code, a QT code, a driver's license, a smart card, a membership card, a validation, a PayPal code, a smartphone pay, a biometric or other information source by the secure ID module 104 and/or the locking module 108 and/or the payment module 106 triggers release of the locking module 108, allowing removal of the animal. The recognition of a credit card, a debit card, a PayPal identifier, a membership card, a smartphone pay, or other payment method for removal of the animal sometimes triggers billing of the payment method holder. Recognition of a merchant or other validation may trigger collection from a validation provider.

The door 101 may be constructed of solid material including without limitation metal, plastic, fiberglass, or other rigid material and is sometimes perforated for ventilation. The door may comprise any appropriate material as known in the art and is sometimes colored or decorated. The decoration 110 sometimes comprises a custom decoration and/or name. In some embodiments plaque holder 112 is configured to receive and retain a plaque bearing the name of the animal or other inscription, a card, photograph or other display.

In various embodiments the door 101 may comprise discontinuous material such as a mesh of wire or other material. In certain embodiments the door 101 comprises soundproofing material 114 which may be integral to the door 101 or be applied to the inside or the outside of the door 101. The soundproofing material 114 may be rigid foam, flexible foam, baffles, dead air space, noise cancelling technology, or other sound suppressing material as known in the art.

Figure 2:
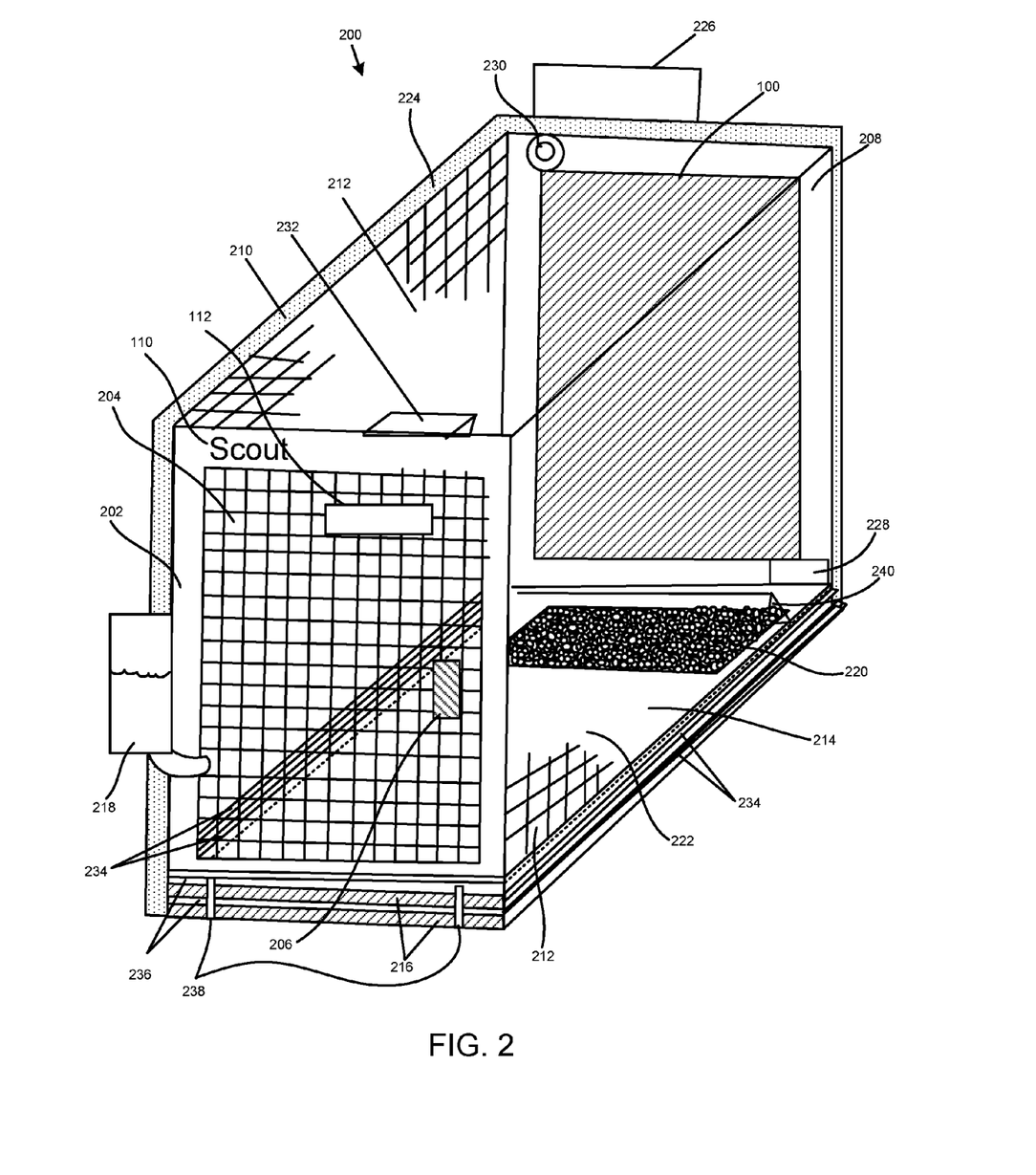
FIG. 2 is a partial cutaway perspective line drawing depicting an embodiment of an enclosure in accordance with the present invention.

FIG. 2 is partial cutaway perspective line drawing illustrating an embodiment of an enclosure in accordance with the present invention. In certain embodiments the enclosure 200 comprises a door 101, an end 202, a door 204, a latching module 206, a second end 208, a top 210, a side 212, a tray 214, a floor 216, a water dispenser 218, a litter area 220, a play area 222, soundproofing material 224, a climate control unit 226, a sensing module 228, an audio/video module 230, an audio/video broadcast module 232, a tray support 234, a tray slot 236, a tray lock 238, and a tray liner 240.

The ends 204 and 208, the doors 101 and 204, the top 210 and the side 212 may be constructed of solid material with provisions for ventilation or of wire mesh or other open material. In some embodiments the enclosure 200 is collapsible, foldable, and/or easily disassembled for convenient transport and storage. In certain embodiments the tray 214 is removable. The water dispenser 218 is sometimes refillable from the outside, allowing an attendant to supply water without opening the door 204 or the door 101 of the enclosure 200. The door 101 may comprise a solid, perforated, mesh, soundproofing, or other material. The door 204 sometimes comprises a decoration 110. In some embodiments the door 204 comprises a plaque holder 112 configured to receive and retain a plaque bearing the name of the animal or other inscription or a card, picture, photograph or other item.

The floor 216 may comprise a solid floor, a tray 214, or a liquid permeable perforated panel or fine mesh with a tray 214 beneath. The tray 214 is sometimes removable. The tray may be disposable and/or carry a liner 240 which may be disposable. The tray 214 may slide on the tray supports 234 and be removed through the tray slot 236. In some embodiments a tray lock 238 secures the tray 214 in place. In certain embodiments two or more sets of tray supports 234 are spaced from each other at vertical intervals in communication with multiple tray slots 236 to allow multiple trays to be inserted and removed. For example a first tray 214 may be in position on tray supports 234 when the animal is inserted. If the first tray 214 becomes soiled a second tray 214 may be inserted through a higher or lower tray slot 236 and the soiled first tray 214 removed.

In practice the new tray 214 may be partially inserted and the animal coaxed onto the new, higher tray 214 and then the insertion completed. Or the initial tray 214 may be positioned higher and the new tray 214 inserted below it. The liner 240 may cover all or part of the tray 214 and may comprise absorbent, moisture proof, odor proof, or other appropriate material. A tray 214 bearing a liner 240 may similarly be removed for liner 240 replacement.

In some embodiments the litter area 220 allows for an animal to relieve itself and the play area 222 allows room for the animal to comfortably move about. In certain embodiments the enclosure 200 is sized according to the animal's breed, weight, and height to allow the animal room to stand, turn around, and lie down comfortably. In various embodiments the enclosure 200 is sized comfortably close to the dimensions of the animal so as to discourage the animal from relieving itself within the enclosure 200. The enclosure 200 may comprise any appropriate material and may sometimes be colored or decorated.

The sensing module 228 is sometimes a moisture sensing module and may be, without limitation a temperature sensing module, an odor sensing module, a ventilation sensing module or a motion sensing module. In certain embodiments the sensing module 228 is a water level module. The sensing module 228 may trigger an alert to an attendant for services such as refilling water, cleaning the cage, adjusting the temperature and the like. In some embodiments the sensing module 228 may transmit sensory information including without limitation temperature, humidity, odor, and ventilation from within the enclosure or the surrounding environment. Sensory information may be transmitted in real time and/or stored for later scheduled transmission. In various embodiments the sensory module 228 output is transmitted to the User, Attendant, and/or other designated recipient via a receiving device such as, without limitation, a cell phone, a smart phone, a computer, a tablet, or other receiving device.

The audio video broadcast module 232 is sometimes configured to broadcast images and/or voice, music, or other sound into the enclosure. The images and sound may comprise public content such a television or internet, or other electronic broadcasts and sometimes comprises individual transmissions from a personal electronic or other device. In certain embodiments the audio/video module 230 is configured to capture images from within the enclosure, which images it may store, record, or transmit and may comprise a microphone configured to sense and transmit sound from within the enclosure or the surrounding environment. Images and sound may be transmitted in real time and/or stored for later scheduled transmission or viewing. In various embodiments the audio/visual module 230 output is transmitted to a receiving device such as, without limitation, a cell phone, a smart phone, a computer, a tablet, or other receiving device that may be in the possession of a User.

In some embodiments the soundproofing material 224 comprises rigid foam and may also comprise without limitation flexible foam, dead airspace, baffles, noise canceling technology or other soundproofing material known in the art. In various embodiments the climate control unit 226 comprises a fan, a fan in combination with water or ice, a dry ice enclosure, an electric heat pump, a compressor driven heat exchange cooling system, an electric heater, a gas heater, a solar powered heater or cooler, or other climate control system as known in the art.

In certain embodiments the User approaches the enclosure 200 from end 208 and triggers release of the locking module 108 by exposing the animal's microchip to the animal ID module 102. In some embodiments recognition of a secure ID by the secure ID module 104 triggers release of the locking module 108 either alone or in combination with recognition of an animal ID by the animal ID module 102. The User may then open the door 101, insert the animal, and close the door 101. In some embodiments recognition of a credit card, a debit card, a bar code, a QT code, a driver's license, a smart card, a membership card, a PayPal code, a smartphone pay, a biometric, or other information source triggers re-engagement of the locking module 108. In some embodiments the User the employs a physical key, fob, or other keying device or enters a code to trigger re-engagement of the locking module.

In various embodiments the User, upon return, presents a credit card, a debit card, a bar code, a QT code, a driver's license, a smart card, a membership card, a PayPal code, a smartphone pay, a biometric, or other information source or uses a code or physical key to release the locking module 108. The User may then open the door 101 and remove the animal. The door 101 may remain open or automatically relock. Upon removal of the animal the sensing module 228 may transmit an alert that the enclosure 200 is vacant for cleaning and disinfecting. An attendant may then open the door 204, the door 101, or present appropriate ID to access the enclosure 200 for servicing, after which the locking module 108 may be reset manually or automatically for subsequent use.

In some embodiments a signal such as, for non limiting example, re-presentation of the same animal's microchip or the same credit card, other ID information, code or key, within a determined time period overrides the cleaning alert, allowing a User to remove the animal for a walk or play, and then reinsert the animal back into the same enclosure 200.

Figure 3:
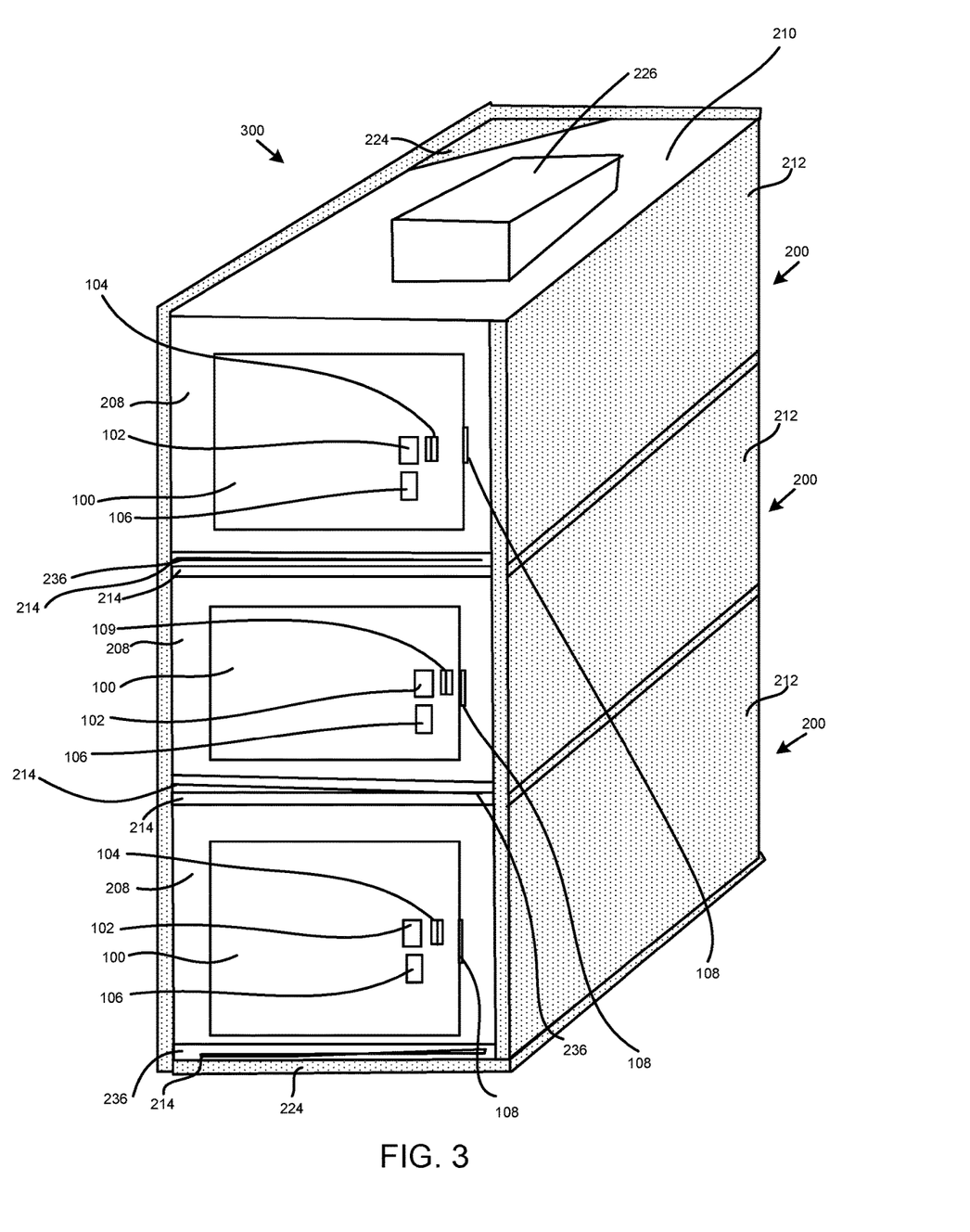
FIG. 3 is a partial cutaway perspective line drawing illustrating an embodiment of an assembly of a plurality of enclosures in accordance with the present invention.

FIG. 3 is a perspective line drawing depicting a partial end view of an embodiment of an assembly 300 of a plurality enclosures 200 each comprising a door 101, an animal ID module 102, a secure ID module 104, a payment module 106, a locking module 108, an end 208, a top 210, a removable tray 214, tray supports 234, a tray slot 236, soundproofing material 224 and a climate control unit 226. The floor 216, second end 202, door 204, and interior features as depicted in FIG. 2 are obscured in this view but understood to be present in certain embodiments. The soundproofing material 224 may surround each enclosure 200, or it may surround the assembly 300. In areas where soundproofing is not necessary the soundproofing material 224 may be absent. The climate control unit 226 is sometimes present for each enclosure 200 and sometimes is sized and positioned to climate condition the assembly 300 of enclosures 200. In areas, such as interior spaces where separate climate control is not necessary the climate control unit 226 may be absent.

The assembly 300 of enclosures 200 may be installed in or near a location such as an office complex, a shopping mall, a theater, a medical office, hospital, school or other venues in which employees or patrons need or desire a cost effective, safe, secure and comfortable temporary accommodation for a pet. Some, any, or all of the adjacent enterprises may choose to provide validations, analogous to parking validations, that the payment module 106 may be configured to accept. Venues sometimes provide free use of the assembly 300 to customers or clients.

In certain embodiments the assembly 300 of enclosures is colored or decorated, for example, to complement the colors, theme, style, or spirit of the venue. Such embodiments may enable the venue to encourage pet owners to make the animal part of the shopping or other experience and thus augment the attractiveness of the venue.

In some embodiments, for non-limiting example, assemblies 300 of enclosures 200 are installed for municipalities as adjuncts to a municipal parking system. In such embodiments payment may be linked to systems such as the municipality's parking payment system. Individual enclosures 200 and/or one or more assembly 300 of enclosures may be configured for portability and installed in conventions, meetings, carnivals, dog shows, and other permanent and temporary locations. The proximity to the locations of the User's work or activities could allow for convenience of drop off and pick up as well as periodic interaction with the pet such as walks or play time during lunch breaks etc.

Figure 4:
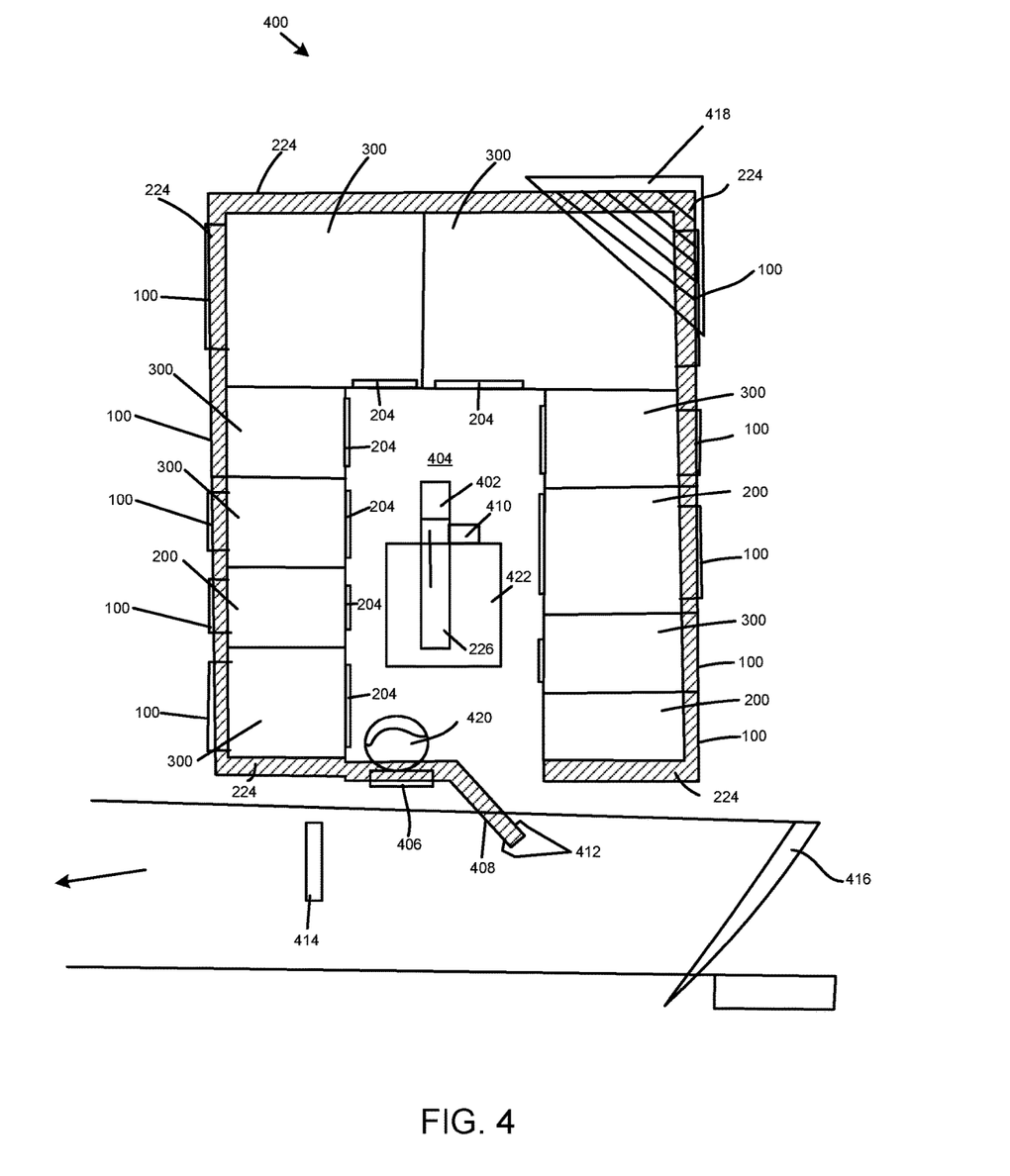
FIG. 4 is a schematic line drawing depicting a cutaway top view of an embodiment of an array of assemblies of enclosures in accordance with the present invention.

FIG. 4 is a cutaway top view line drawing of an embodiment of a structured array 400 of enclosures 200 and assemblies of enclosures 300. As depicted in this embodiment the structured array 400 comprises a media module 402 situated in an open space 404, sound proofing material 224, a climate control unit 226, an attendant window 406, an attendant door 408 with a locking module 412, an audio/visual receiving and/or transmission module 410, a roof 418, an attendant station 420, and a retail/display space 422. The attendant door 408 sometimes comprises the attendant window 406. In some embodiments the structured array 400 comprises a combination of enclosures 200 and assemblies 300 of enclosures arranged in any proportion or configuration.

The structured array 400 may comprise single enclosures 200, assemblies of enclosures 300 and any combination of the two. The sound proofing material 224 may be arranged around the entire structured array 400, around assemblies 300 of enclosures or around individual enclosures 200. The climate control unit 226 may climate condition the entire structured array 400 or any combination of assemblies 300 of enclosures or single enclosures 200. In mild climates or indoor or other locations not requiring climate control the climate control unit 226 may be absent. In areas not requiring sound proofing material 224 that feature may be absent.

The media broadcast module 402 may comprise one or a plurality of units and may be visible from all or any part of the structured array 400 of enclosures. In various embodiments the camera and microphone 410 comprises one or a plurality of units to allow viewing and sound of all of any part of the structured array 400 of enclosures.

In certain embodiments a User approaches the structured array 400 from the outside, and triggers release of the locking module 108, opens the door 101, inserts the animal, closes the door 101 and engages the locking module 108 as described for FIG. 2. In some embodiments door 204 faces inward. Door 204 may comprise discontinuous material such as a mesh or perforated solid material, allowing the animals to see into the open space and allowing the attendant to see and communicate with the animals. In various embodiments the attendant supplies water and other items from the outside and thus need not handle the animals.

In the depicted embodiment the structured array 400 of enclosures is installed in a parking lot. A sensing bar 414 is configured to alert an attendant to the approach of a vehicle and a vehicle bar 416 may be activated by the attendant from inside the structured array 400. In the depicted embodiment a parking lot attendant may also serve as the enclosure attendant, optimizing the individual's time and providing a more comfortable and interesting environment than the typical small, monotonous, and often hot or chilly parking attendant box.

In various embodiments the structured array 400 of enclosures 200 may be installed in a shopping mall, an office complex, convenient to municipal parking, a restaurant, a theater, a hospital, a medical office, a university, an amusement park, at meetings, conventions, carnivals, dog shows, or in any area where patrons or employees would need or desire a cost effective, safe, secure and comfortable temporary accommodation for an animal. Municipalities and other venues may offer Users cost-free use of enclosures 200, assemblies of enclosures 300, or structured arrays 400 of enclosures 200 within a specific radius or transferrable use for a set period of time, analogously to public transportation fare free zones and transfer tickets.

Users of the various configurations might visit, walk, or play with the conveniently located animal during the course of a workday or other activities, benefitting the safety, comfort, and socialization of the pet and the health, enjoyment, and peace of mind of the User. The User may gain access to the pet for feeding, play, or removal as described for FIG. 2.

In some embodiments the structured array 400 is configured, colored, and decorated to reflect the coloring, spirit, and theme of the surrounding venue. The structured array 400 may be configured to offer retail space for pet supplies, boutique items and other merchandise and/or space for advertising. A structured array 400 may be independently provided or sponsored by a particular brand, store, or other enterprise. The combination of convenient, safe, and comfortable pet housing, an attractive ambiance, available services, and retail offerings may make the structured array 400 a destination for Users seeking services and supplies for their animals and social interaction with other pet owners. As such, the structured array 400 may become a significant draw for the surrounding venue. Some, any, or all of the adjacent enterprises may choose to provide validations, analogous to parking validations, that the payment module 106 may be configured to accept. Venues sometimes provide free use of the structured array 400 to customers or clients.

Figure 5:
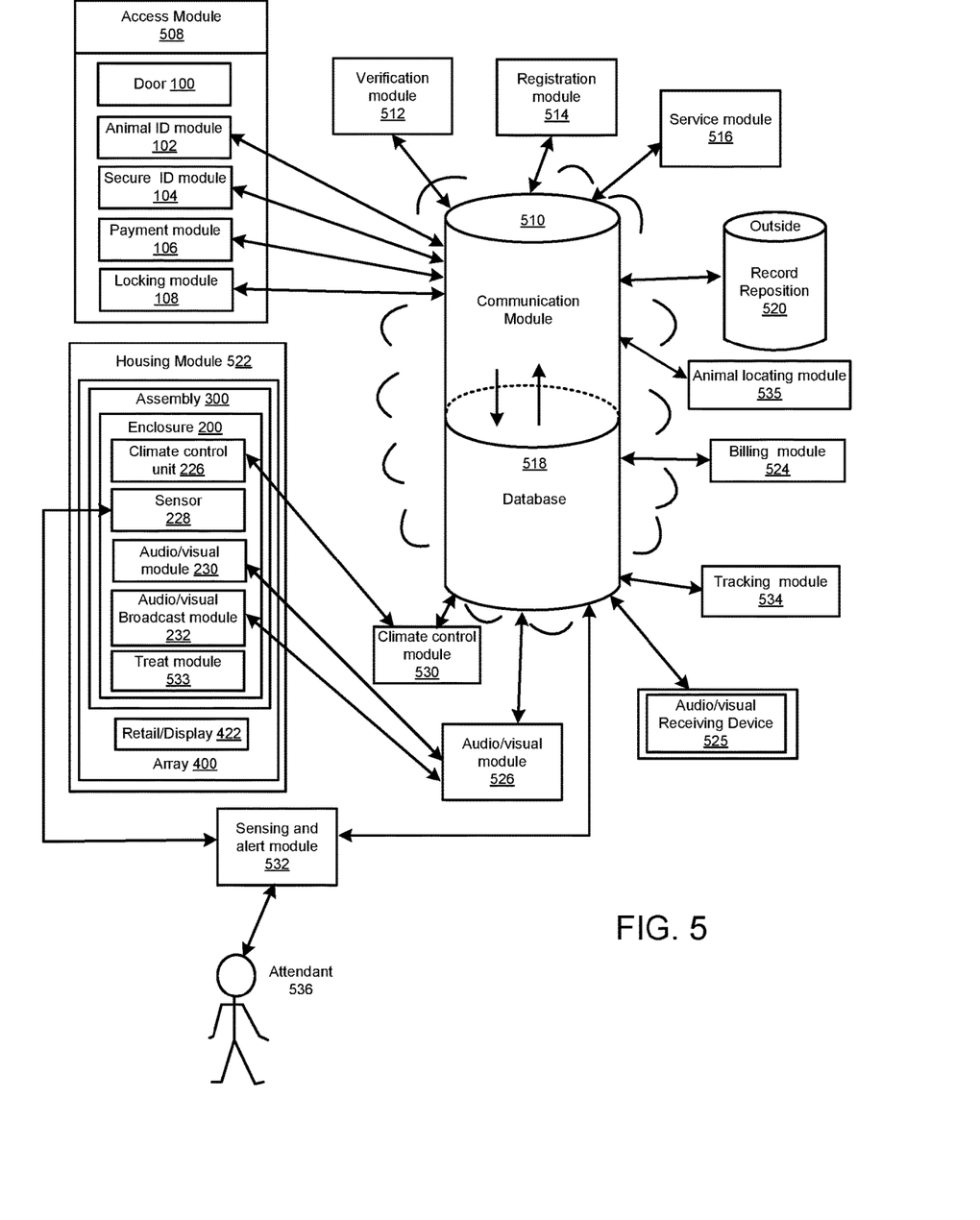
FIG. 5 is a schematic block diagram depicting an embodiment of a system in accordance with the present invention.

FIG. 5 is a schematic block diagram depicting an embodiment of a system 500 for a secure and comfortable animal enclosure. As depicted, the system 500 comprises an access module 508, a communication module 510, a verification module 512, a registration module 514, a service module 516, a database 518, an outside record repository 520, a housing module 522, a billing module 524, an audio/visual module 526, an audio/visual receiving device 528, a climate control module 530, a sensing and alert module 532, a treat module 533, a tracking module 534, an animal locating module 535, an attendant 536, and a website 537. As depicted the access module 508 comprises a door 101, an animal ID module 102, a secure ID module 104, a payment module 106, a locking and release module 108. In certain embodiments the housing module 522 comprises at least one of an enclosure 200, an assembly 300 of enclosures 200 and an array 400 of enclosures 200 or of assemblies 300 in any combination. The enclosure 200 sometimes comprises one of more of a climate control unit 226, a sensing module 228, an audio/visual module 230 and an audio/visual broadcast module 232.

In certain embodiments the registration module 514 sends registration information through the communication module 510 to the database 518 for storage, retrieval, and tracking. The tracking module 534 may scan the database 518 to verify current vaccination. If, for example, a specific vaccination has expired for a registered animal, the tracking module 534 might alert the communication module 510, which would contact the appropriate outside record repository 520, sometimes the animal's veterinary office. The tracking module 534 could also instruct the locking module 108 to shut down access for that animal's microchip or other identification. The tracking module 534 may periodically query the outside record repository 520 and upon receiving notice of the updated vaccination could alert the database 518. The tracking module 534 may then instruct the locking module to allow access for the animal's microchip or other identification. In some embodiments the tracking module 534 communicates with the locking module 108 through the communication module 510. In this manner Users may have confidence that their pets are exposed only to healthy animals whose vaccinations are up to date.

The registration module 514 may request certain User information such as, without limitation, a payment method, secure ID information, and animal information such as, without limitation, microchip, health/vaccination and veterinary contact information. The verification module 512 may access the database 518 and/or outside sources through the communication module 510 and compare data to verify that the User identification information presented is consistent with stored or otherwise known User identification information. The verification module 512 sometimes verifies pet identification and records in a similar fashion and may also verify payment, service provider, service request and other information. The registration module 514 may link animal vaccination, health, or other information to a preferred form of the secure ID, including without limitation a credit card, a debit card, a PayPal account, a smartphone pay, a driver's license, a state ID card, and a special membership card issued by the system 500.

The treat module 533 may dispense a treat to the animal in response to a signal and may charge an authorized payment method for the treat.

The system 500 may make various registration options available to the User. For non-limiting example, the User may register for general availability-based use of an enclosure 200 in a housing module 522 at one or more locations in various cities, states, and nations. A User may also register for regular use of either of any available enclosure 200 in a housing module 522 at selected dates and times or for exclusive use of a specific enclosure 200 in a specific housing module 522. In certain embodiments upgraded registration includes various member benefits and may have a specific title. In case of exclusive use the User may select a decoration 110, including without limitation the name of the animal on door the 101 and/or the enclosure 200. The User sometimes receives or a custom plaque for insertion into the plaque holder 112 or can bring a suitably configured item of the User's choice. Such registration may allow the User to furnish the specific enclosure 200 with the pet's toys, bedding, blankets, food or water dishes, or favorite treats. In that instance, the User's animal may form a home-like or den-like attachment to the enclosure 200—the animal's own condo in the city, so to speak.

In some embodiments the system 500 issues a specific membership card that the User may present a specific or any secure ID module 104, payment module 106, and locking release module 108 to trigger opening and/or locking of the door 101, payment, and other services. In some embodiments expected frequent use would motivate the User to opt for the upgraded registration.

In various embodiments a User may also register for special services, which may be offered as part of upgraded registration. Service providers such as, without limitation, pet groomers, dog walkers, animal trainers, and veterinarians may apply to register and approved providers may be included in the database 518. Thus User's may request, for non-liming example, periodic pet grooming from, perhaps, a mobile grooming unit, the services of a dog walker, a trainer, or an in person or electronic veterinary visit. In such instances the service module 516 may schedule a service. In some embodiments the User enters a request for a specific provider. Outside service providers may offer special arrangements or prices to Users of the System 500, particularly since the close proximity of a number of animals to serve may be convenient and time efficient for the service provider. The availability of outside services may add an additional dimension of enjoyment to Users and their pets, combining the advantages of pet housing with a pet spa.

The animal locating module 535 may comprise a collar, a tracking transmitter and receiver as known in the art and may be applied to an animal entering an enclosure 200 to assist in locating the animal in the event that the animal escaped when removed from the enclosure 200 for handling by the User or others.

In certain embodiments a User accesses the communication module 510 through an electronic or other device. The communication module 510 may provide any or all of inter-module communication and external bi-directional communication with the internet and service providers. In certain embodiments the communication module 510 comprises a state machine that may serve as the traffic manager over a set of modules to route process execution from the state of one module to other modules. In various embodiments the state machine comprises one of more of a VLSI circuit, a gate array, a logic chip, a transistor, a programmable hardware device such as a field programmable gate array, programmable array logic, and a programmable logic device or the like. The communications module 510 may utilize computer, telecommunications, cloud and digital security technologies.

In some embodiments any module herein engages in Inter-module communication and comprises at least one of wireless communication channels and hardwire connectivity to the internet with its own unique Internet Protocol (IP) address. In this context any module may be a Thing, uniquely addressed and controlled in the Internet of Things by the communications module 510 apparatus.

In certain embodiments communication consists of digital and/or audio/video commands coordinated and directed by the communications module 510. The communication module 510 interfaces with the database 518 to access stored data in support of various registration, verification, service, billing, tracking, climate control, sensing and alert, and audio/visual functions. The communication module 510 sometimes comprises an application directed to a smartphone, tablet, or other device that enables the User and/or authorized others to register, reserve an enclosure 200, request specialized services, monitor the animal and perform other functions remotely.

The communications module 510 sometimes controls a set of modules that may comprise one or more lockers and serves as the communicator for a locker to the external, non-local internet or cloud service providers. In this context service providers comprise at least one of a provider of pet-related activities such as, but not limited to, veterinary or grooming services, training services, computer cloud computer services, and ISPs (internet service providers).

The system 500 may comprise a website 537 or other remote display means which may be configured to allow registration, reservations and other functions and may display schedules, offers, pictures, audiovisual and video content, advertising and other content. In some embodiments the system 500 has a presence on social media. The communication module 510 in combination with at least the audio/visual module 526 may post promotions, pictures, videos, text, and other content to social media sites such as, without limitation, Facebook, Instagram, Pintrest, YouTube, and Twitter.

The attendant 536 may be an employee of the system 500 and may be full time or part time at a specific housing module 522 or may rotate between various locations. In some embodiments an employee of an associated building, store, mall, or other enterprise functions as the attendant 536. Due to the automated features of the system 500 the attendant 536 need not consume time with paperwork. Furthermore, the electronic tracking and access management may eliminate human error and random exceptions.

In some embodiments the audio/visual module 526 collects and transmits audiovisual information to the User and/or authorized others through a designated audio/visual device 528 or other device. The audiovisual information is sometimes transmitted in real time, sometimes periodically, and sometimes on demand. In certain embodiments the audio/visual module 526 utilizes the internet. As a result of this feature Users may view, hear, monitor and communicate with their pets remotely, diminishing the pet's sense of isolation and adding to the User's peace of mind.

In various embodiments the climate control module 226 monitors temperature and other conditions within the housing module 522 and communicates with the climate control module 530 to maintain a safe and comfortable environment within the housing module 522. In certain embodiments the sensing and alert module 532 monitors conditions within the housing module 522, including without limitation odors and indications of animal distress and alerts the attendant 530 or the User including through a specified electronic device. The attendant 530, who in some embodiments may attend more than one housing module 522, or do building maintenance, parking lot attendance, or other work, is then on notice to respond to the alarm.

When the User removes the animal the payment module 106 may alert the billing module 524 to trigger billing to the User's credit card, debit card, PayPal account, system membership card, smartphone pay, or other payment system. In some embodiments the billing module 524 calculates billing rates based on enclosure 200 size, length of stay, discounts or special offers, incentives for frequent release and return of the animal, and other factors.

In certain embodiments the system 500 comprises a retail/display space 422 in which pet supplies boutique items or other merchandise may be offered for sale or various items displayed.

Figure 6:
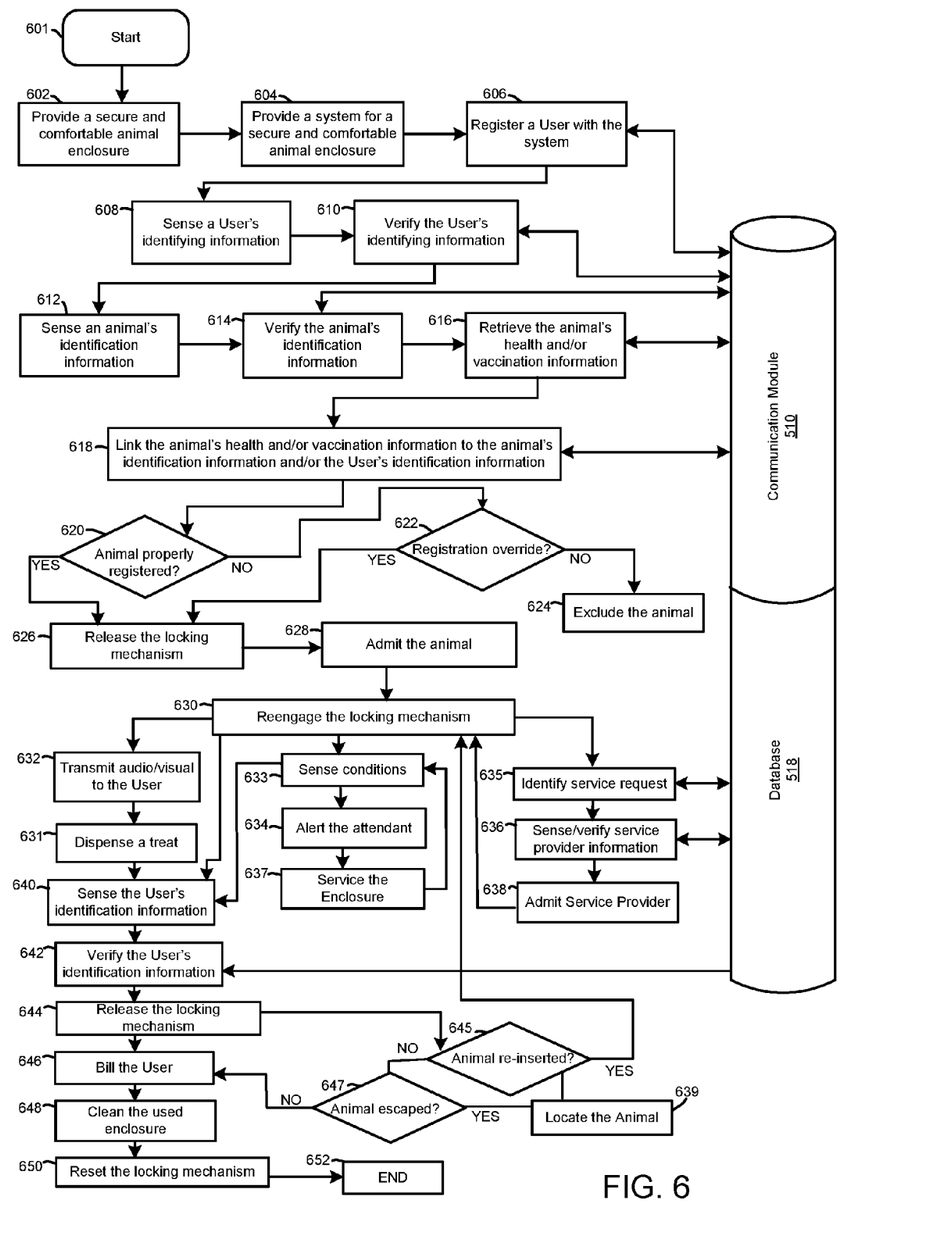
FIG. 6 is a schematic flow chart depicting an embodiment of a method in accordance with the present invention.

FIG. 6 is a schematic flow chart diagram depicting an embodiment of a method for a secure and comfortable animal enclosure. As depicted the method comprises the steps of: start 601, provide 602 a secure and comfortable animal enclosure, provide 604 a system for a secure and comfortable animal enclosure, register 606 a User with the system for a secure and comfortable animal enclosure, sense 608 a User's identifying information, verify 610 the User's identifying information, sense 612 an animal's identifying information, verify 614 the animal's identification information, retrieve 616 the animal's health and/or vaccination information, link 618 the animal's health and/or vaccination information to the animal's identification information and/or the User's identification information, query 620 if the animal is properly registered, if YES release the locking module, if NO query 622 if there is a registration override, if NO exclude the animal, if YES, release 626 the locking module, admit 628 the animal, reengage 630 the locking module, sense 633 conditions, alert 634 the attendant, service 637 the enclosure, identify 635 a service request, sense/verify 636 service provider information, admit 638 the service provider, locate 639 the animal if escaped, reengage 630, the locking mechanism, transmit 632 audio/visual to the User, dispense 631 a treat to the animal, sense 640 the User's identification information, verify 642 the User's identification information, query 645 if the animal is readmitted, if YES reengage 630 the locking module, if NO query 647 whether the animal has escaped, if YES locate 649 the animal, if NO bill 646 the User, clean 648 the used enclosure, and reset 650 the locking module and END 652.

In certain embodiments a No to the registration query 620 may be triggered by, for example, a lapsed health record or expired vaccination and may also be triggered by non-registered User information. A YES to the query of a registration override may result when an animal enclosure may be accessed by cash, credit card, or other payment method without reference to specific information such as User identification, animal identification, animal health records and the like. In such a case a cautionary notice may be posted.

In some embodiments billing 646 is directly to a credit card, debit card, PayPal account, smartphone pay, membership card, or other payment method used for access, or could be billed to a different card, collected in cash, or billed to the User. Payment is sometimes by validation provided by a merchant, municipality or other entity. The cost for the animal's stay may be a fixed rate per hour, or may escalate after a given period in order to encourage Users to limit stays to a humane time period. In certain embodiments the rate may be reduced upon removal of an animal for a walk or play and reinsertion, to encourage Users to allow animals an opportunity to exercise and relieve themselves during the stay.

A certain maximum uninterrupted stay duration could be established, after which the rate may become progressively higher. The registration contract may specify consequences of failure to timely collect an animal, which might include delivery of the animal to the local Humane Society and an accompanying charge. Depending upon the nature of the animal and skill of the relevant attendant, emergency provision, including appropriate liability clauses, may be made allowing an attendant to assist an animal in the case of emergency or unavoidable User delay. Such provisions may be helpful to a User and avoid animal neglect or suffering.

In some embodiments of the method herein the step register 606 the User comprises a pet club membership conferring benefits such as enclosure reservations, special, rates, and specific services. In certain embodiments a User can request services such as grooming, training, or walking for the animal. Approved service providers may be registered and may offer special rates or other incentives.

Figure 7:
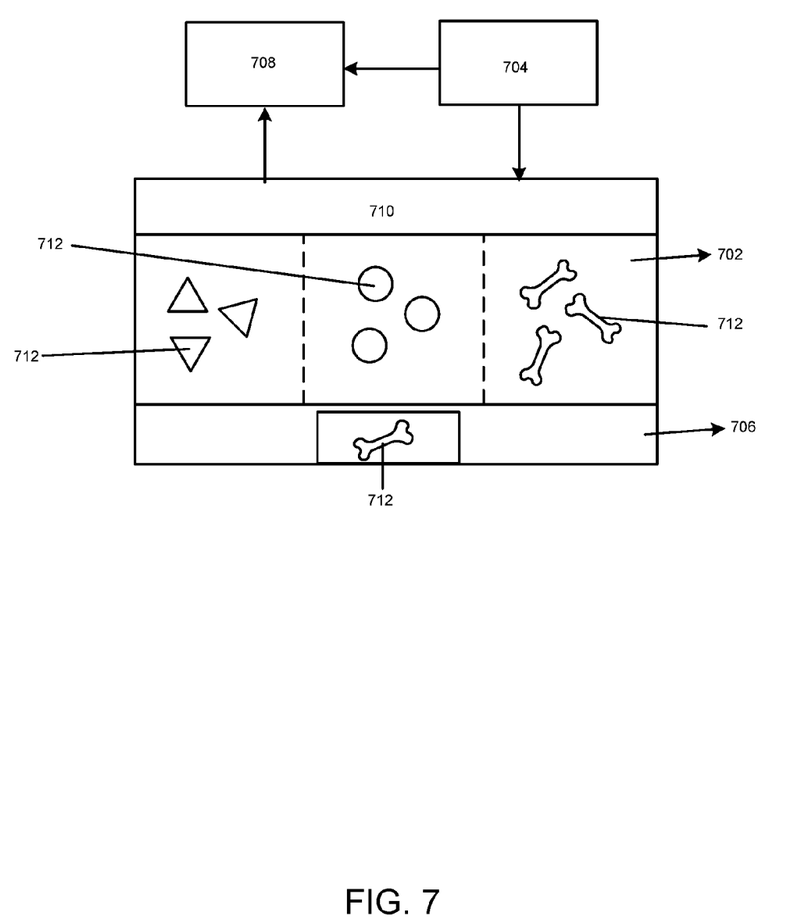
FIG. 7 is a schematic block diagram depicting details of an embodiment of a treat module.

FIG. 7 is a schematic block diagram illustrating an embodiment of a treat module 533 comprising a repository 702, a signal receiver 704, a dispensing module 706, a charging module 710, a treat selection module 712 and a treat 714. The dispensing module 706 may be located in any position on the animal enclosure 200 such that a treat 714 may be dispensed into the enclosure 200. The repository and signal receiver may be located on the enclosure 200 or elsewhere such that the treat 714 may be dispensed within the enclosure 200.

In some embodiments the signal receiver 704 receives a signal from an electronic or other communication device including, without limitation, a cell phone, tablet, or computer, which activates the treat repository 702 to release a treat 714 into the dispensing module 706 and may trigger the charging module 710 to charge a designated account for the treat. In various embodiments the designated account comprises a debit, credit, anonymous payment or other account associated with the user or other designee. The account is sometimes the same account associated with insertion and release of the animal. A variety of treats may be available for selection and may be formulated for a specific size, breed, age, preference, or health condition of the animal. In certain embodiments the treat selection module 712 selects a treat based on specific information, sometimes including registration information, for an individual animal.

Figure 8:
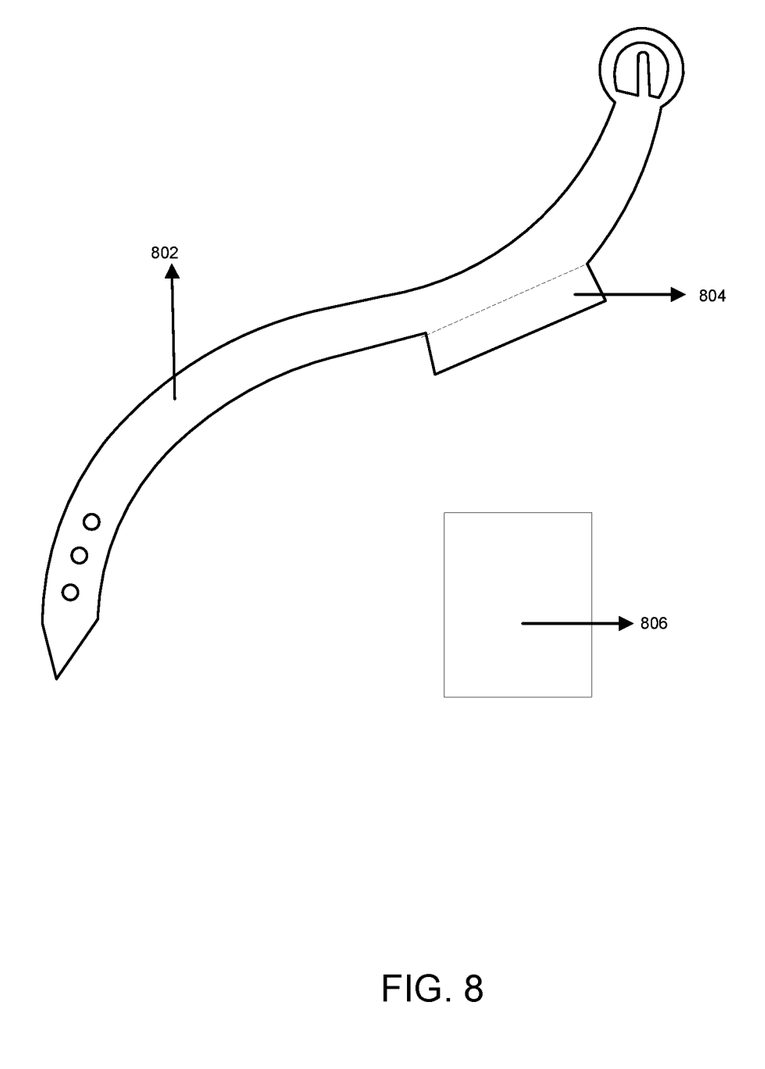
FIG. 8 is a schematic block diagram depicting an embodiment of an animal locating module.

FIG. 8 is a schematic block diagram depicting an embodiment of an animal locating module 535. The animal locating module 535 may comprise a collar 802, a tracking transmitter 804 and receiver 806 as known in the art. The collar 802 and the tracking transmitted 804 may be applied to an animal entering an enclosure 200 to assist in locating the animal in the event that the animal escaped when removed from the enclosure 200 for handling.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for a secure and comfortable animal enclosure, the enclosure comprising:
   a secure enclosure;
   an access module;
   a secure identification module that reads and processes a form of personal identification such as a credit card, a debit card, a bar code, a QT code, a driver's license, a smart card, a membership card, a PayPal identifier, a smartphone pay, a fob a biometric and the like;
   an animal identification module that reads and processes a form of animal identification such as a microchip, a brand, a biometric and the like;
   a payment module that reads and processes a payment method such as a credit card, a debit card, a bar code, a QT code, a driver's license, a smart card, a membership card, a PayPal identifier, a smartphone pay and the like; and
   a locking module that locks and/or releases in response to a signal originating in at least one of the secure identification module, the animal identification module and the payment module.

2. The enclosure of claim 1, further comprising a sound-proofing material such as noise cancelling technology, rigid foam, flexible foam, baffles, dead air space, or other sound suppressing material as known in the art.

3. The enclosure of claim 1, further comprising at least one of a sensing module that senses at least one of temperature, odor, and moisture and an alert module that alerts an attendant that the enclosure needs attention.

4. The enclosure of claim 1, further comprising a plurality of supports for a plurality of removable horizontal trays spaced at vertical intervals configured such that a first tray may be removed and a second tray inserted while an animal remains in the enclosure.

5. The apparatus of claim 1, further comprising a climate control module that maintains the interior of the enclosure at a safe and comfortable temperature.

6. The apparatus of claim 5 further comprising a sensing module that senses and transmits at least one of temperature, humidity, odor, ventilation, and other information.

7. The enclosure of claim 1, further comprising an audio/visual module comprising at least one of an audio/visual receiving and/or broadcast module and an audio/visual capture and/or transmission module wherein the audio/visual module captures and transmits and or receives images and/or audio signals between the inside of the enclosure to a personal electronic device.

8. The enclosure of claim 1, further comprising a decoration comprising at least one of a color, a design, and a holder configured to receive and retain at least one of a plaque, card, photograph, and other display and wherein a brand, a store, a business, or other enterprise may optionally sponsor or provide the decoration.

9. The enclosure of claim 1, wherein the enclosure is incorporated into a municipal parking system.

10. The structured array of claim 9, further comprising at least one of a roof, an attendant station, an attendant window, and at least one of a retail or display space.

11. The structured array of claim 9, further comprising at least one of a climate control module, an audio/visual receiving module, a media broadcast module, and an audio-visual transmission module.

12. The structured array of claim 9, wherein the structured array is configured for installation within or near at least one of a shopping mall, an office complex, a parking area, a restaurant a theater, a hospital, a medical office, a university, a meeting location, a convention, a carnival, a dog show, and other public or private venue.

13. An apparatus for a secure and comfortable animal enclosure, the enclosure comprising:
   a secure enclosure;
   a treat module comprising a signal receiver configured to receive a command including from a remote personal device;
   a dispensing module configured to dispense a treat to within the enclosure; and
   a charging module configured to track and invoice treat transactions.

14. A structured array of a plurality of the enclosure of claim 1, further comprising an interior open space wherein each apparatus comprises an outside-facing point of access that opens upon presentation of appropriate ID to receive or release an animal and an inside facing point of access that opens toward the interior open space.

15. A system for a secure and comfortable animal enclosure, the system comprising:
   a housing module comprising an animal enclosure or a plurality of animal enclosures in any configuration;
   an access module that provides access to the housing module and comprising a secure ID module, an animal ID module, a payment module, and a locking module;
   a communication module that provides inter-module communication and external bi-directional communication with communication networks and service providers;
   a database that stores identification information, registration information, animal health records, vendor and venue information, audio/visual information and other information relating to the system;
   a registration module that presents registration options and accepts identification, payment, preference, and other information relating to a User or animal registration with the system;
   a verification module that verifies secure identification information, animal information, service provider information, and the like;
   a service module that accepts, transmits, and coordinates a User request for animal related services such as grooming, walking, training, and veterinary services and authorizes the access of an approved service provider to the relevant enclosure;
   a billing module the calculates charges for use of the system based on cost schedules and at least one of special offers, merchant and other validations, and membership status and bills the User; and
   a tracking module that tracks animal health records and other relevant information.

16. A system for a secure and comfortable animal enclosure, the system comprising:
   a housing module comprising an animal enclosure or a plurality of animal enclosures in any configuration;
   an access module that provides access to the housing module and comprising a secure ID module, an animal ID module, a payment module, and a locking module;
   a communication module that provides inter-module communication and external bi-directional communication with communication networks and service providers;

a database that stores identification information, registration information, animal health records, vendor and venue information, audio/visual information and other information relating to the system;

a registration module that presents registration options and accepts identification, payment, preference, and other information relating to a User or animal registration with the system;

a verification module that verifies secure identification information, animal information, service provider information, and the like;

a service module that accepts, transmits, and coordinates a User request for animal related services such as grooming, walking, training, and veterinary services and authorizes the access of an approved service provider to the relevant enclosure;

a billing module the calculates charges for use of the system based on cost schedules and at least one of special offers, merchant and other validations, and membership status and bills the User;

a tracking module that tracks animal health records and other relevant information: and an animal locating module comprising a transmitter configured to be applied to an animal and to emit a location signal and a receiver configured to locate the origin of the signal.

17. The communications module of claim 15 wherein the communications module comprises a computer state machine that serves as the traffic manager over a set of modules to route process execution from the state of one module to other modules and wherein the state machine comprises at least one of a VLSI circuit, a gate array, a logic chip, a transistor, a programmable hardware device such as a field programmable gate array, programmable array logic, and a programmable logic device or the like and utilizes computer, telecommunications, cloud and digital security technologies.

18. The system of claim 15 wherein at least one module has wireless and hardwire connectivity to the internet with its own unique Internet Protocol address.

19. The system of claim 15, further comprising an audio/visual module that at least one of transmits audio or visual content to the housing module, collects and transmits images from within the housing module to at least one of a smartphone, a tablet, a computer, or other personal receiving device, and posts content on at least one of a website and social media.

20. The system of claim 15, further comprising a sensing and alert module that senses conditions within the housing module and at least one of alerts an attendant of a need for attention and transmits information to a personal electronic device.

21. A system for a secure and comfortable animal enclosure, the system comprising:

a housing module comprising an animal enclosure or a plurality of animal enclosures in any configuration;

a treat module comprising a signal receiver configured to receive a command including from a remote device;

a dispensing module configured to dispense a treat to within the enclosure; and a charging module configured to track and charge treat transactions.

22. The system of claim 15 wherein the housing module further comprises at least one of a retail and display space.

23. A method for a secure and comfortable animal enclosure the method comprising:

provide a secure and comfortable animal enclosure comprising a secure ID module, an animal ID module, a locking module, and a payment module;

provide a system for a secure and comfortable animal enclosure comprising a communication module, a database, a registration module, a verification module and a payment module;

register a User with the system for a secure and comfortable animal enclosure;

sense the User's identifying information;

verify the User's identifying information;

sense an animal's identifying information;

verify the animal's identification information;

retrieve the animal's health and/or vaccination information;

link the animal's health and/or vaccination information to at least one of the animal's identification information and the User's identification information;

release the locking module;

admit the animal and reengage the locking module;

receive a remote treat dispensing signal dispense a treat bill the User verify the User's identification information;

release the locking module to remove the animal; and bill the User.

24. The method of claim 23, further comprising the steps provide an audio/visual module; and at least one of broadcast audiovisual content within the enclosure and transmit audiovisual content from within the enclosure to at least one of a personal electronic device, an attendant, and social media.

25. The method of claim 23, further comprising the steps provide a service module, identify a service request, verify a service provider's identification and admit the service provider to the enclosure.

26. The method of claim 23, further comprising providing an animal with a location module comprising a transmitter configured to emit a location signal and receiver configured to locate the origin of the signal.

* * * * *